Oct. 17, 1939.  T. GAMBLE  2,176,377
STRAINER AND JUICER FOR PITCHER TOPS AND THE LIKE
Filed April 4, 1938
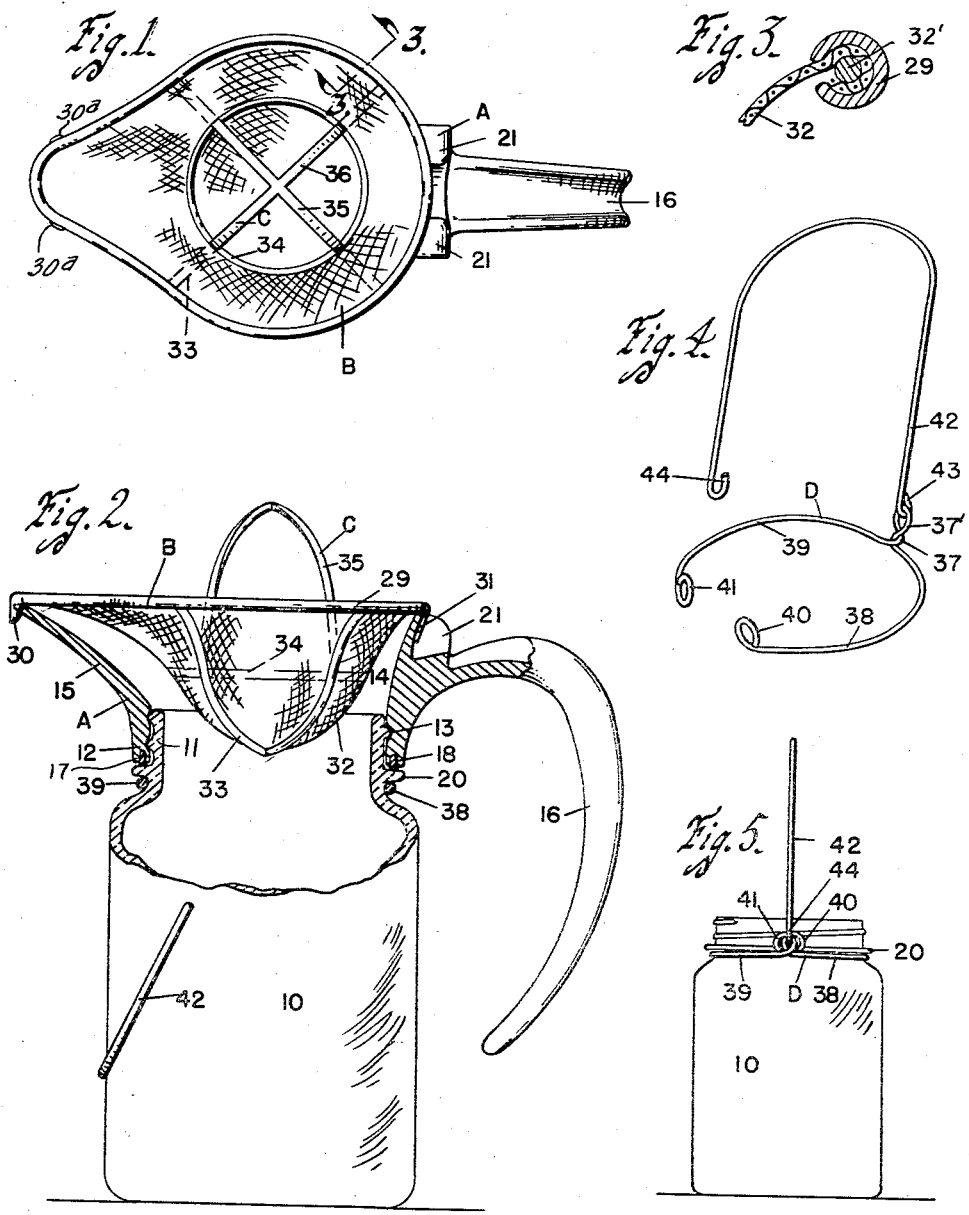
INVENTOR.
Theolian Gamble
BY Bair & Freeman
ATTORNEYS.

Patented Oct. 17, 1939

2,176,377

UNITED STATES PATENT OFFICE 2,176,377

STRAINER AND JUICER FOR PITCHER TOPS AND THE LIKE

Theolian Gamble, Des Moines, Iowa

Application April 4, 1938, Serial No. 199,918

7 Claims. (Cl. 146—3)

The object of my invention is to provide a strainer and juicer for pitcher tops and the like.

More particularly, it is my object to provide a strainer and juicer particularly adapted for use with detachable pitcher tops, such as that disclosed in my co-pending application, Serial No. 102,140, filed September 23, 1936.

It is another purpose to provide a strainer adapted to conform to the shape of the pitcher top or the like having a pouring spout, said strainer having members adapted to snap over the edges of the pitcher top for securing the strainer to the pitcher top.

Still a further object is to provide such a strainer having a top frame member preferably made of wire and preferably arranged to conform in shape to a pitcher top with a pouring spout, said frame having supported thereon a foraminous strainer cup adapted to extend down into the pitcher top and having its wall or walls inclined from the center upwardly to the frame and preferably having reinforcing wires or the like under the strainer top secured at their upper ends to the frame.

Another purpose is to provide with such a strainer a fruit juicer element having a lower ring-like member adapted to rest on the inside of the strainer cup spaced above the bottom thereof and preferably supported by said supporting wires and having upwardly extending wire-like members on which a half of a lemon, orange or the like may be placed for juicing it.

Another object is to provide a simple bail-type handle.

With these and other objects in view, my invention consists in the construction, arrangement and combination of the various parts of my strainer and juicer, whereby the objects contemplated are attained, as hereinafter more fully set forth, pointed out in my claims, and illustrated in the accompanying drawing, in which:

Figure 1 is a top or plan view of a strainer and juicer embodying my invention installed on a pitcher top.

Figure 2 is a vertical, sectional view of a pitcher top having my strainer and juicer seated thereon, the pitcher top being mounted on a fruit jar, parts of which are broken and parts of which are shown in section; this view also illustrates the bail and handle partly in section and partly in elevation.

Figure 3 is a detail, sectional view taken on the line 3—3 of Figure 1.

Figure 4 is a perspective view of the bail type carrying handle; and

Figure 5 is a side elevation of a fruit jar having my bail type carrying handle installed thereon.

In the drawing for purposes of illustrating a way in which my strainer and fruit juicer may be used, I have shown an ordinary fruit jar indicated at 10. The jar 10 is provided with the reduced, externally threaded neck 11 on which is seated my improved pitcher top, which is the subject matter of my co-pending application, and which is here indicated generally by the reference character A.

The pitcher top A has a lower, annular sleeve-like portion 12 internally screw-threaded at 13 to fit the threads of the neck of the fruit jar.

The pitcher top has the upwardly flared portion 14 provided at the front with what may be called the pouring lip 15.

At the rear of the pitcher top is the handle 16.

At the lower face of the tubular portion 12 of the pitcher top is an annular groove 17 which receives a gasket 18 of rubber or the like so that the gasket projects from the top and will engage the ordinary flange 20 on the jar for making a leak-tight joint.

The upper part of the top A adjacent the handle 16 is provided with a pair of laterally spaced lugs 21.

*Structure of strainer and fruit juicer*

My strainer which is intended to cooperate with the pitcher top A is indicated generally at B and the fruit juicer is indicated generally at C.

My strainer consists of a foraminous strainer cup 32 which may be made of woven wire or the like, which preferably tapers from its bottom upwardly to its top. At its upper edge, the strainer cup 32 is secured to a frame 29 in the manner now to be described.

The frame 29 is conformed in shape to the shape of the top of the pitcher top A. The upper edge of the strainer cup 32 is curled around the wire 32' as best shown in Figure 3 and the wire 32' and the curled portion of the cup 32 is received in the wire-like split sleeve forming the frame 29.

For reinforcing the strainer cup 32 and also for supporting the juicer thereon described below, I provide under the cup 32 the supporting wires 33 having their upper ends secured to the frame 29 by welding or any suitable means. The strainer has at its opposite ends the downwardly projecting fingers 30 and 31.

The whole frame 29 in its actual structure has some resiliency, but at least one of the fingers 30—31 should have enough resiliency so that the fingers can be snapped over the pitcher top.

It will be observed that the outer surface of the pitcher top inclines inwardly and downwardly from its upper end, and thus the strainer will be secured to the pitcher top.

Where the strainer is used with a pitcher top or the like having lugs 21, those lugs prevent any rotary movement of the frame 29 on the pitcher top.

The juicer C is so arranged as to cooperate with the particular form of strainer above described.

A ring 34 is arranged to rest on the inside of the foraminous strainer cup 32 spaced above the bottom thereof, so that there will be a minimum amount of fibrous parts in the lower part of the strainer cup during the juicing of the fruit.

The ring 34 may be free from the other parts or may be welded to the wire supports 33.

It will be observed that the wire supports 33 are so arranged by their inclination, that they form supporting means for holding the ring 34 and for maintaining it in a level or horizontal position substantially above the lower bottom part of the strainer cup.

Extending upwardly from the ring 34 are equally spaced wire juicer members 35—36 which converge to a common point at the top as shown in Figure 7. They may be made of separate wires or otherwise as desired.

In Figures 4 and 5, I have shown a convenient bail type handle D adapted for use in conjunction with a container having a flange like the flange 20. This handle includes a collar, preferably made of a single piece of wire, forming at one side a loop 37' and then twisted as shown at 37 and then forming similar curved arm-like members 38 and 39 terminating in loops 40 and 41.

A bail member 42 has at one end a loop 43 interconnected with the loop 37'. At the other end is an open loop 44 adapted to be inserted through the loops 40 and 41 for fastening them together and locking the members 38—39 around the neck of the container below the flange 20.

A strainer and juicer of the kind herein described has many advantages which will be obvious, particularly when used with a pouring spout pitcher top or the like, such as has been described.

It will be noted that the strainer can be quickly, easily and conveniently installed or removed from the pitcher top.

When in use, anything may be strained through and fruit can be conveniently juiced, letting the juice run into the container below.

It will be noted that the strainer cup 32 is of such shape that what may be called its forward part is spaced from the pouring spout 15 of the pitcher top so that by providing a notch in the center of the pouring spout at its top, the entire device may be used for pouring from the container without removing the strainer.

Where this form of structure is used, I preferably provide two downwardly projecting tongues 30a as shown in Figure 1 to engage the pouring spout on opposite sides of the tip thereof, so that the means for holding the strainer in place on the pouring top will not interefere with pouring operations.

It is, therefore, obvious that changes may be made in the details of the structure of my strainer and fruit juicer and it is my purpose to cover by the claims of the patent to be issued on this application, any modifications in form, structure or arrangement of parts or use of materials, which may be included within their scope and the scope of my invention.

I claim as my invention:

1. A strainer and fruit juicer adapted to be mounted on a pitcher top or the like comprising a frame having members adapted to be snapped over the edge of the pitcher top, a foraminous portion secured to said frame forming a strainer cup with an inclined wall, reinforcing and supporting wires below the top secured to the frame, and a wire juicer having a ring forming the bottom edge resting on the inside of the cup between the bottom and the top thereof and supported by said wires.

2. In a strainer and fruit juicer, an upper frame, a foraminous strainer cup of thin substantially flexible material secured thereto and hanging downwardly therefrom with walls inclined downwardly to a common lower center, rigid supports secured to the frame extending beneath the cup, a fruit juicer comprising a member supported by said rigid supports at a position on the inside of the cup and spaced above the bottom thereof and fruit juicing means extending above and supported by said last-described element.

3. In a strainer and fruit juicer, an upper frame, a foraminous strainer cup of relatively pliable material secured thereto and hanging downwardly therefrom with walls inclined downwardly to a common lower center, a fruit juicer comprising a member supported on the inside of the cup and spaced above the bottom thereof and fruit juicing means extending above and supported by said last-described element, and supporting wires for the cup and juicer under the strainer cup secured at their upper ends to the frame, positioned in supporting engagement with the juicer on the opposite side of the cup and secured thereto through the cup structure.

4. In a strainer and fruit juicer, a foraminous cup having walls of pliable material inclined from its upper edge downwardly to a common point, supporting wires under the cup, a juicer having a ring resting on the inside of the cup spaced above the bottom thereof partially braced and supported by said wires independently of support by the cup walls and a fruit juicing means supported on said ring extending above the strainer cup.

5. A strainer and fruit juicer device serving as a strainer and juicer support adapted to be mounted on the top of a container comprising a bottomless open member, means on said member for securing it to the container and a projection thereon whereby it may be grasped manually, a strainer having a rim for supporting it upon said member, a juicer mounted above the strainer having a non-rotatable attachment connecting it to the rim, and complementary engaging means on the rim and on the open member respectively so that rotation of the juicer during operation may be prevented by grasping the projection on said open member.

6. A strainer and fruit juicer adapted to be mounted on the top of a container comprising an open member attachable thereto having the upper edge flared outward beyond the top of the container serving as a strainer and juicer support and having sealing means between the member and container providing a fluid tight joint so that strained juice may not leak outward therefrom, a strainer having a rim extending over and slightly outside said upper edge of the member for supporting the strainer thereon so that all juice passing from the strainer will be caught in the container, and a juicer mounted within the strainer and non-rotatably secured with respect to said member.

7. A strainer and fruit juicer adapted to be mounted on the top of a container comprising a bottomless open member including means around the lower edges for securing it to the top of the container, a spout on one side and a handle on another side, said member having an upper edge extending around said spout flared outward beyond the top of the container, a combined strainer and juicer having a spout-like shape on one side and a rim extending around the sides and said spout-like shape and projecting over and slightly around the edge of said member, thereby securing said combined strainer and juicer thereto and anchoring it against rotation relative to said member, said combined strainer and juicer including a juicer member secured to the rim and provided with elements supported centerably by said rim.

THEOLIAN GAMBLE.